(12) United States Patent
Preiss

(10) Patent No.: US 6,550,837 B1
(45) Date of Patent: Apr. 22, 2003

(54) TRUCK BED DRAWERS AND METHOD OF CONSTRUCTION

(76) Inventor: Raymond A. Preiss, 114 Little Grove La., North Fort Myers, FL (US) 33907

( * ) Notice: Subject to any disclaimer, the term of this patent is extended or adjusted under 35 U.S.C. 154(b) by 0 days.

(21) Appl. No.: 10/209,380

(22) Filed: Jul. 31, 2002

(51) Int. Cl.$^7$ ................................. B60R 9/06
(52) U.S. Cl. .................................. 296/37.6
(58) Field of Search .............. 296/37.6, 183; 224/404, 538

(56) References Cited

U.S. PATENT DOCUMENTS

| | | | | |
|---|---|---|---|---|
| 1,632,360 A | * | 6/1927 | Wilson | 296/37.6 |
| 4,915,437 A | * | 4/1990 | Cherry | 296/37.6 |
| 5,845,952 A | * | 12/1998 | Albertini et al. | 296/37.6 |
| 5,996,868 A | * | 12/1999 | Paradis | 224/404 |

* cited by examiner

Primary Examiner—Dennis H. Pedder
(74) Attorney, Agent, or Firm—Frank A. Lukasik

(57) ABSTRACT

A system of covered and lockable metal drawer units of variable sizes fitted to a truck rear deck. A series of "C" shaped angled members are welded to the lower surface and an upper deck is welded to the tops of the "C" shaped angled members. The sizes of the drawings may be varied by locating the angled members at the desired sizes. Drawers are inserted into the channels formed by the angled members. Large locking panels are hinged to the lower surface and locked to the upper deck when desired.

1 Claim, 6 Drawing Sheets

TRUCK BED DRAWERS AND METHOD OF CONSTRUCTION

BACKGROUND OF THE INVENTION

The present invention relates to drawers fitted to a truck bed for storage and security and, more particularly, to a plurality of covered and lockable metal drawers of various sizes fitted beneath a truck rear deck.

Pick-up trucks and other light trucks are often retro-fitted with commercially available bed liners, tool chests, and a variety of storage containers. Some light trucks are supplied as motorized chassis without a rear deck or bed. Purchasers of such vehicles are able to custom fit these vehicles with a wide assortment of beds, decks, towing assemblies, welding equipment etc. These customizations are expensive and require skills often beyond those of a regular truck buyer. If for example, a truck required multiple below-deck drawers of various sizes, each drawer would have to be individually constructed, this would be a lengthy and costly process.

The present invention and method, utilizes proven construction and manufacturing techniques to mass produce modular metal drawers which can be assembled to fit a variety of common truck chassis. The invention drawers are slideably fitted into metal retaining brackets which give support to the movement of the drawer and create a modular assembly which can support a truck deck on the topside and attach to frame rails of the truck chassis. By using commonly available materials such as sheet steel, mild steel angle, diamond plate decking, metal hinges, lock units, and jigged construction methods, material and production costs are vastly reduced compared to custom products.

In practice, the creation of modular steel drawers allows a truck buyer to outfit a particular truck in any of a number of configurations with drawers along the whole length of the bed or in any number combination. The invention method of using angled steel as both a drawer guide and a deck support frame provides an assembly which is equally strong whether or not it has many drawers fitted or just a few.

SUMMARY OF THE INVENTION

The present invention consists of a method for mass-producing modular metal drawers and accompanying support framework to be fitted to the frame rails of a truck or other such vehicle.

The construction method for the drawers involves cutting of sheet steel plate according to pre-determined patterns and dimensions and thereafter mounting the cut pieces into jigs for welding. Assembled drawers can be surface treated against corrosion.

The construction method for the support framework is done in the same manner—the length/width requirements for any given vehicle having been previously determined and stored for future use.

It is an object of this invention to provide a method for rapidly and economically creating metal drawers for use under truck decks.

It is a further object of this invention to provide a method for rapidly and economically creating metal drawers support framework for use under truck decks.

It is a further object of this invention to provide a repository of dimensional information for common vehicle sizes and makes to facilitate the rapid creation of frame and drawer units for any given vehicle.

It is a further object of this invention to provide locking covers for all such metal drawers.

It is a further object of this invention to provide a stopping means to keep the drawers from exceeding travel limits.

It is a further object of this invention to provide folding handles which remain flush with the drawer front until used to open the drawer.

It is a further object of this invention to provide a non-skid, durable deck surface which forms the upper component of the framework system.

It is a further object of this invention to provide a sheet metal lower skin surface which forms the lower component of the framework system.

The construction method of the invention framework provides a box structure having a front and a rear member and an upper and lower surface member. Interspersed throughout the length of the box structure, steel angled members are placed perpendicular to the axes of the surface members, spaced apart to accommodate the insertion of a metal drawer and to act as a guide for the drawers.

DESCRIPTION OF THE INVENTION

Figure 1:
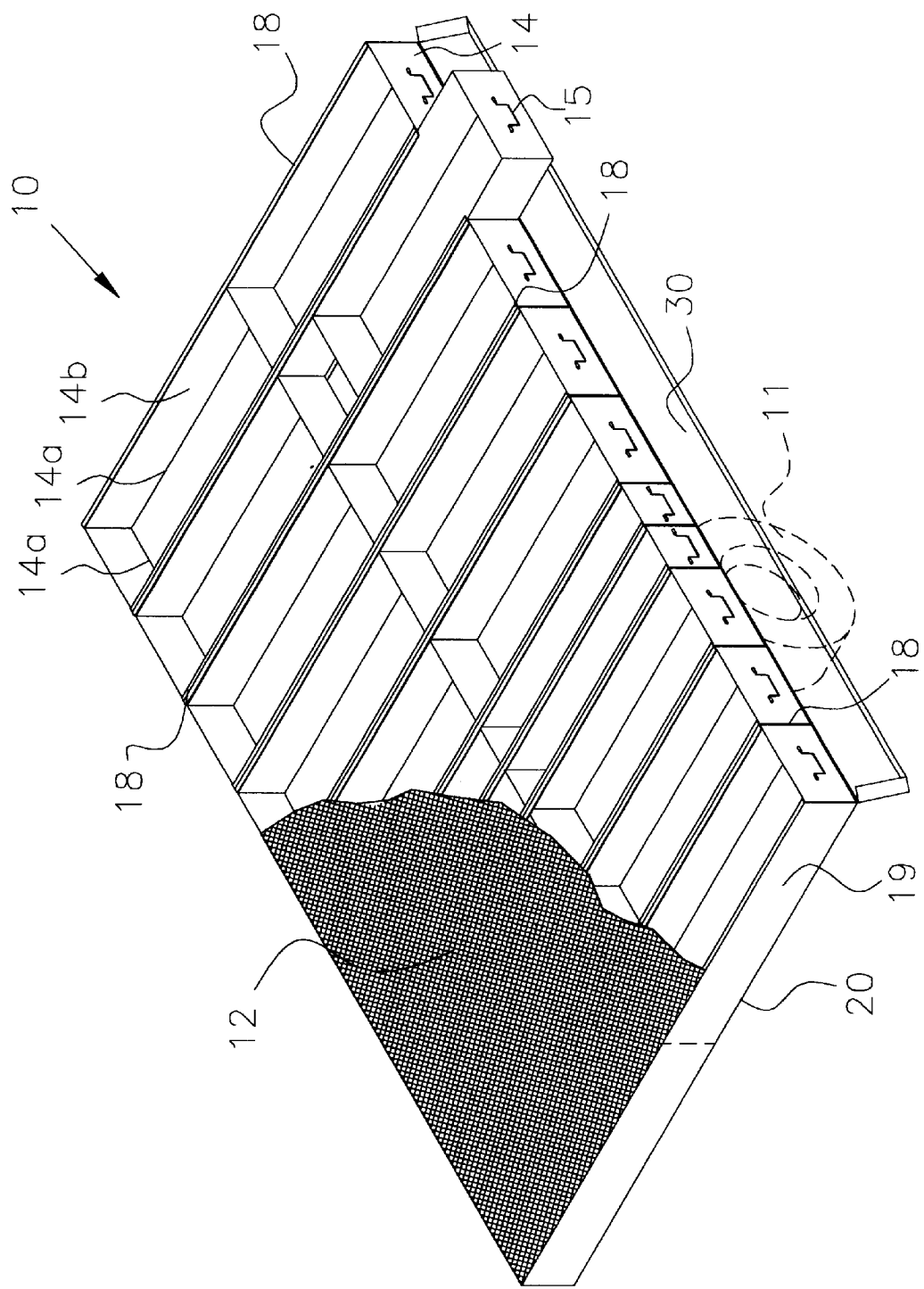
FIG. 1 is an isometric view partially in section, showing a typical installation of drawers.
Figure 2:
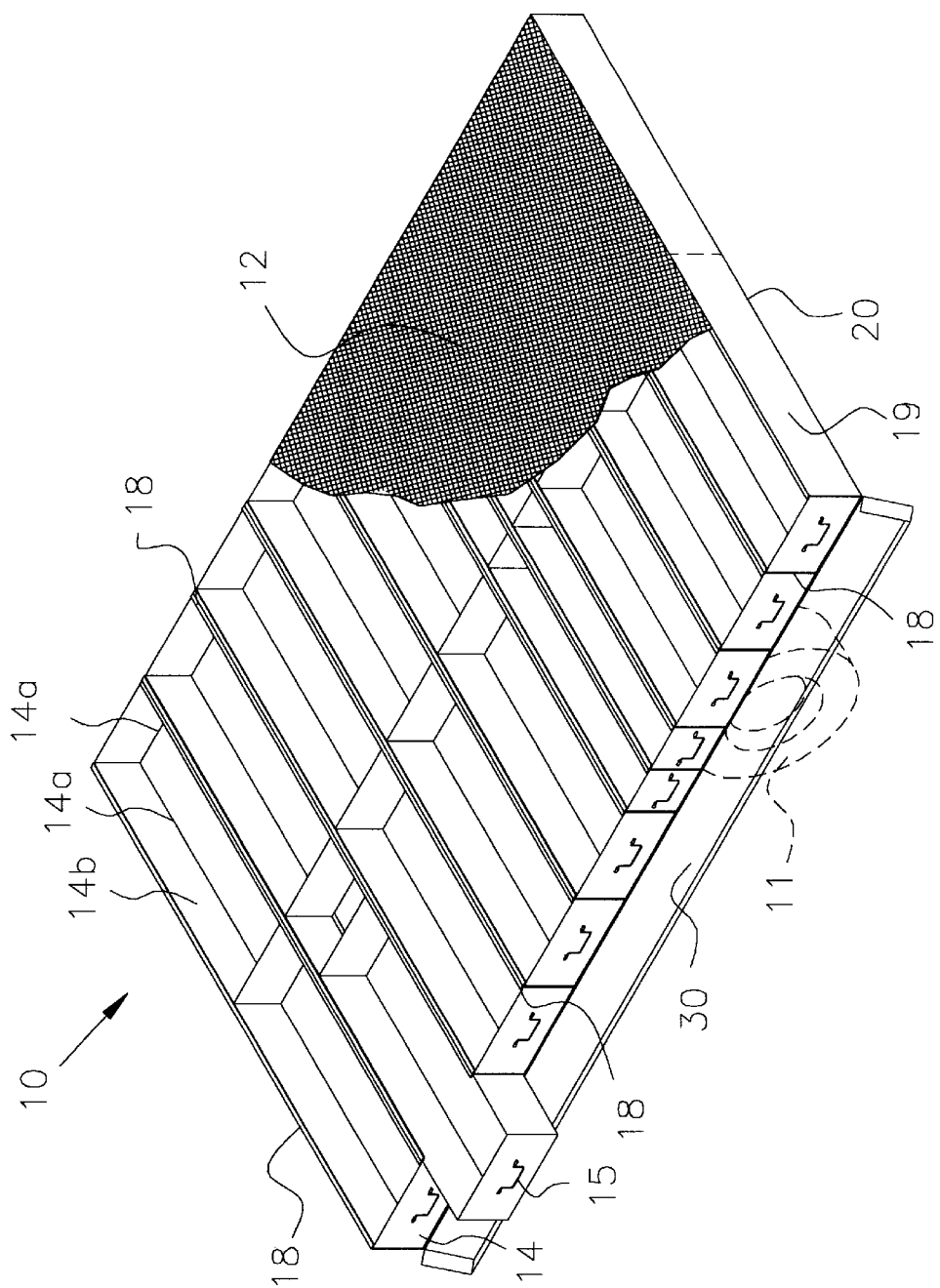
FIG. 2 is an isometric view partially in section, showing a typical installation of drawers.
Figure 3:
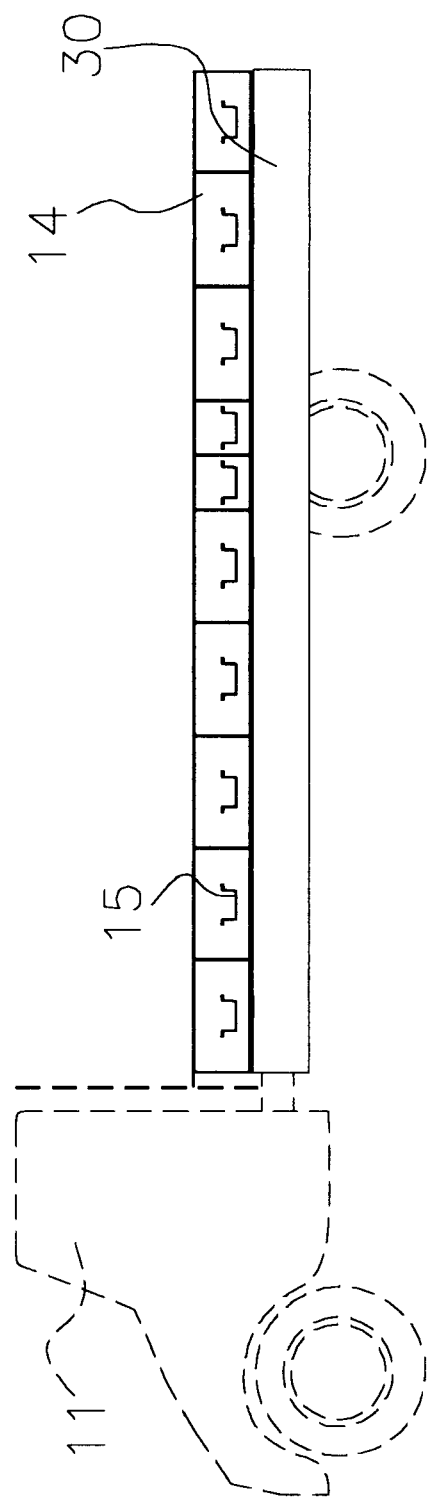
FIG. 3 is a side view showing a typical installation of drawers.
Figure 4:
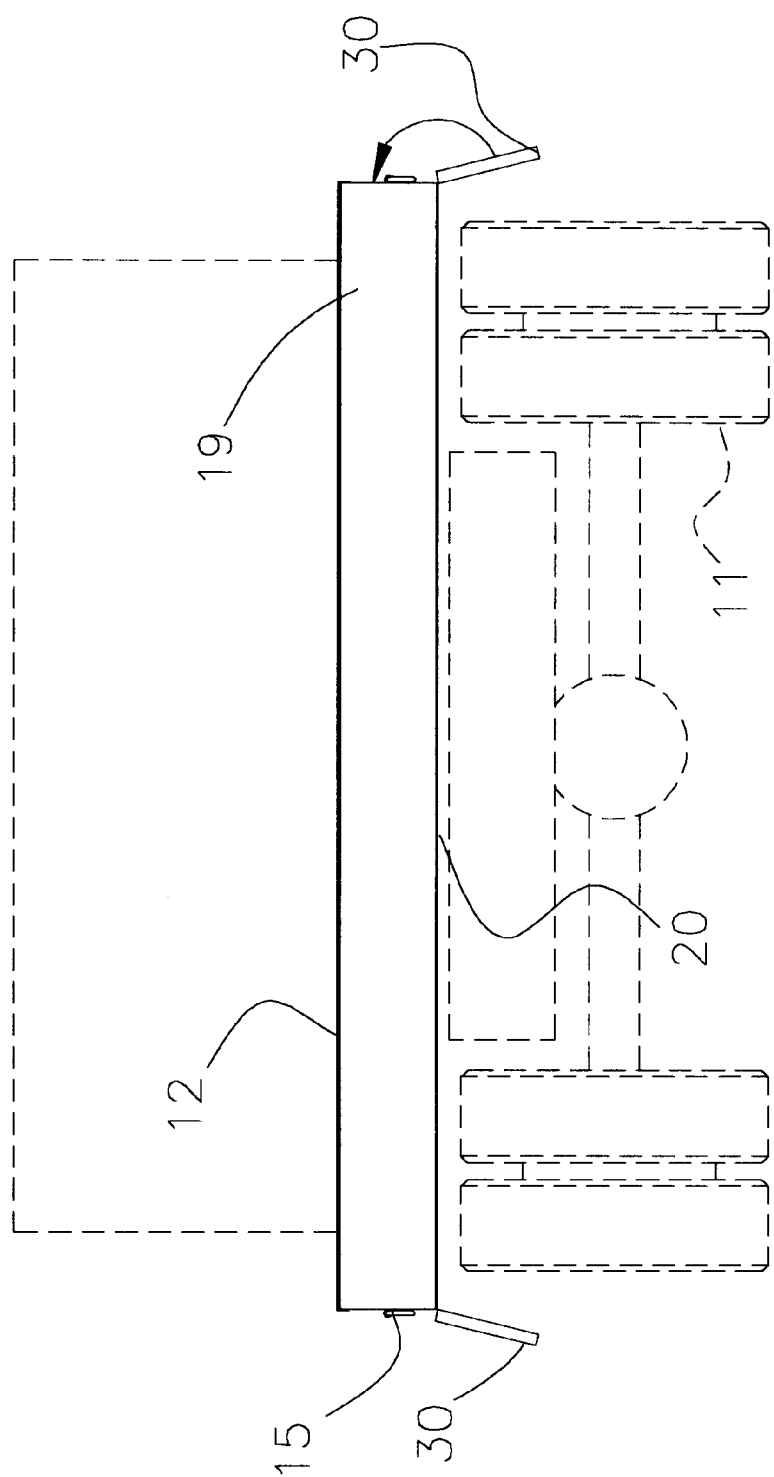
FIG. 4 is a rear view showing the rear framework member of the invention.

Referring now to the drawings, wherein like numerals refer to like and corresponding parts throughout the several views, in FIGS. 1 and 2, the truck bed drawers of the invention are designated by the numeral 10. In FIGS. 1 and 2, support framework 20 is normally fitted to the frame of a truck or other vehicle. The construction method for the drawers 14 involves cutting of sheet steel plates according to the desired size and mounting the cut pieces into jigs for welding.

The truck bed drawers 10 framework provides a box structure having a front and a rear member 19, a lower surface 20 and a deck surface 12. Steel angled members 18 are placed perpendicular to the axes of the surface members and firmly joined as by welding. There are two sets of drawers 14 extending to the center line of vehicle 11. Handles 15 attach to each drawer 14. Drawers 14 extend the entire length of the bed of truck 11. Modular panel 14b is welded at seams 14a.

Figure 5:
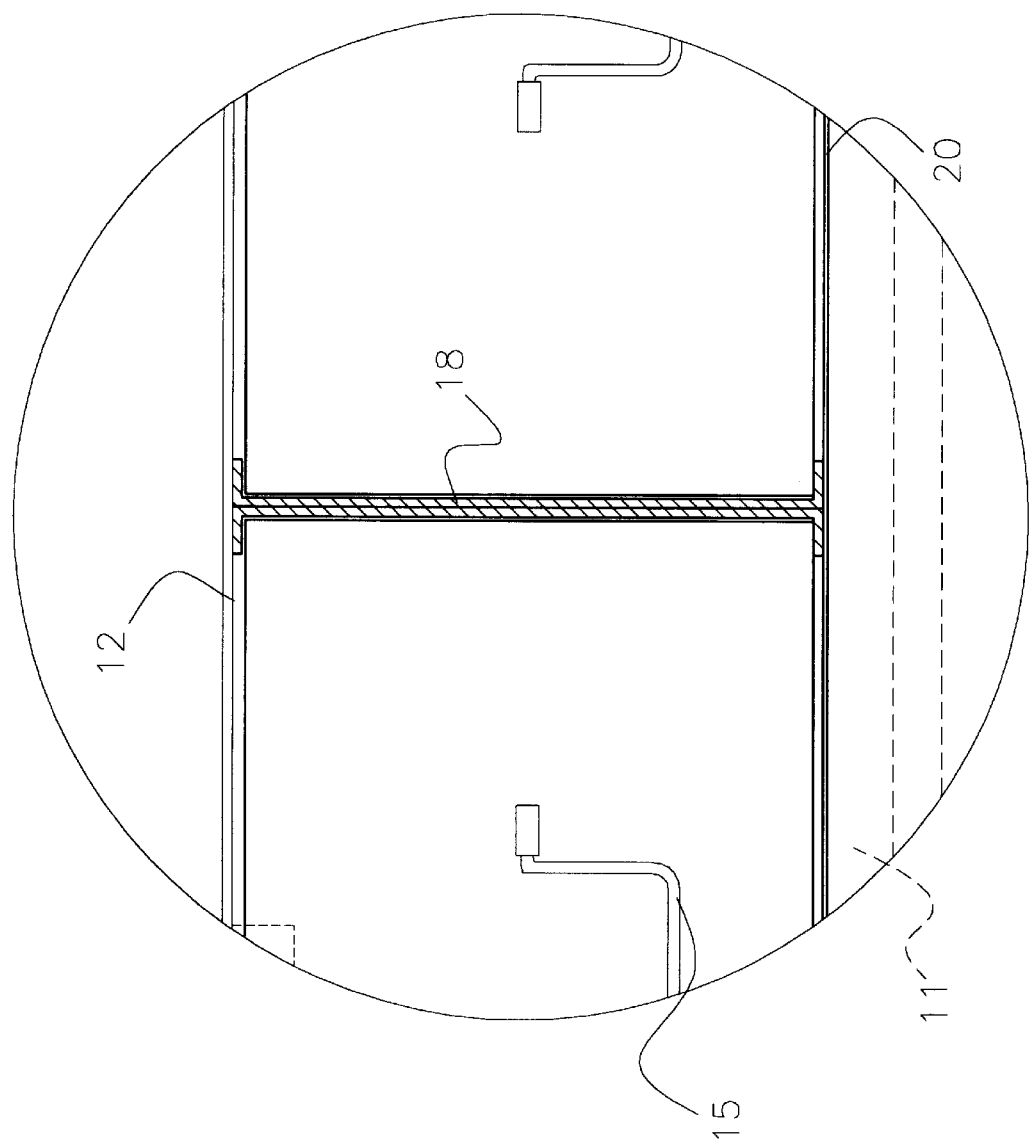
FIG. 5 is a sectional view of frame members in accordance with the invention.

FIG. 5 shows the relationship of the angles 18 to the surfaces 12 and 20 as a guide support for the drawers 14. The angles 18 may be first welded to the base surface 20 and then to the deck surface 12 to complete the assembly.

Figure 6:
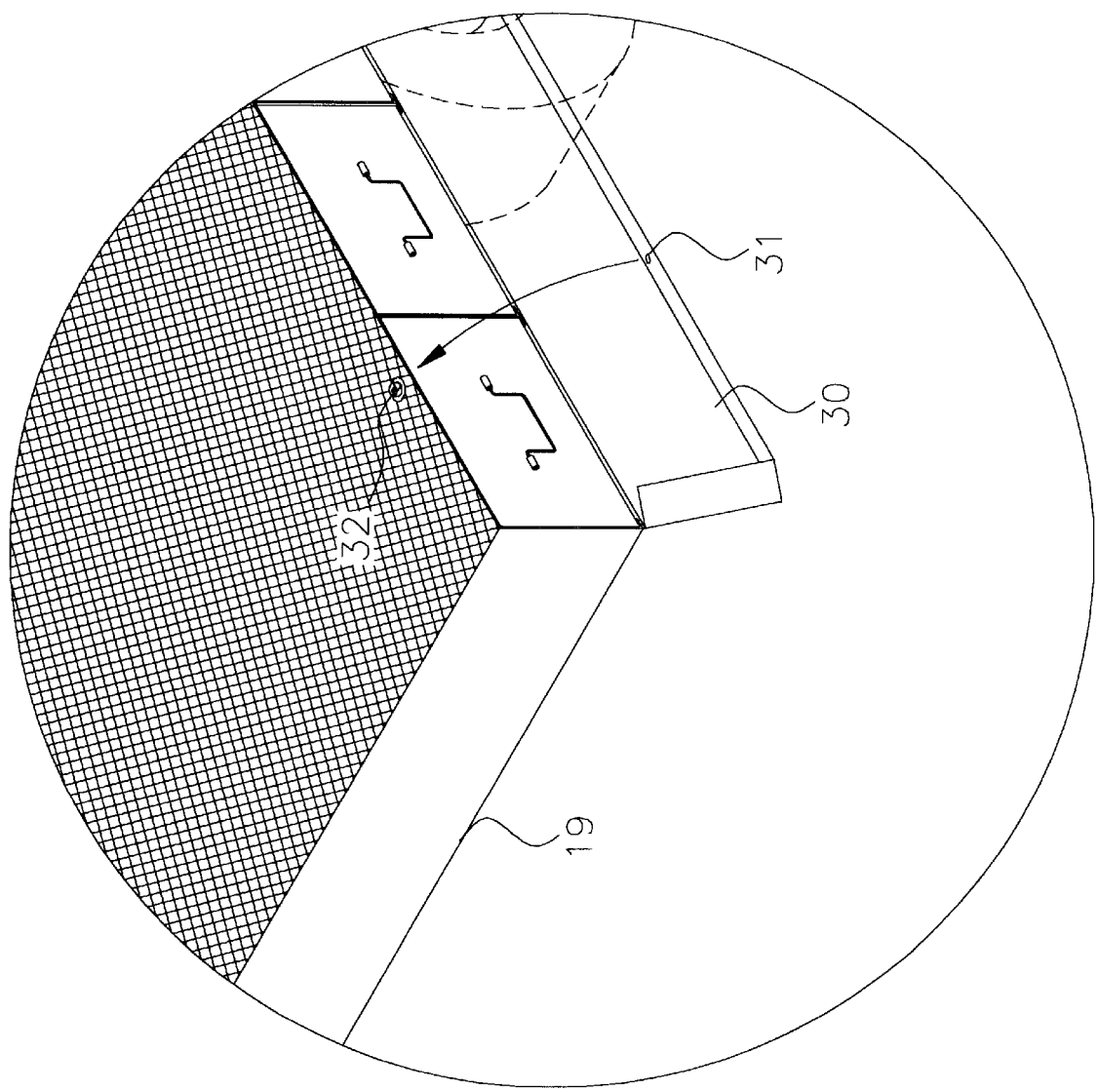
FIG. 6 is an isometric view of a side drawer end cover in accordance with the invention.

FIG. 6 shows a large locking panel 30 which is hinged to the base surface 20. Panel 30 has a hole 31 formed therein at each end to provide a locking action with lock 32. The lock 32 may be a locking device such as a keyed lock or a bolt to keep the panel 30 in a secure position. The locking panel 30 serves two purposes, i.e., to prevent the drawers 14 from being vibrated open when under way and to provide a security lock to protect valuable tools and/or supplies.

What is claimed is:

1. A system of covered and lockable metal drawer units of variable sizes fitted to a truck rear deck, said system comprising:

a steel, horizontal lower surface having a first edge and a second edge, said lower surface affixed to the frame of the truck, a plurality of steel angled members, said angled members being placed perpendicular to said lower surface and at a selected distance between said members, each of said angled members having a right angle bend at opposite sides thereby forming a "C" shape having a top side and a bottom side, each of said angled members being paired up with an angled member with said right angled bends facing opposite to each other, a series of said opposite paired angled members bottom sides being welded to said lower surface along said first edge and a series of said opposite paired angled members being welded to said lower surface along said second edge, each pair of said angled members thereby forming a drawer channel, a steel, horizontal deck surface having a first edge and a second edge, said deck surface being placed over said plurality of steel angled members and having said first edge aligned over said first edge of said lower surface and said second edge being aligned with said second edge of said lower surface, said opposite paired angled members top sides being welded to said deck surface along said deck surface first edge and a series of said opposite paired angled members being welded to said deck surface along said deck surface second edge, each of said edges having locking means formed therein, a plurality of steel drawers, each drawer being inserted into each one of said drawer channels, each of said drawers having a hinged handle, and a locking panel being hinged to each of said lower surface edges, each[ ]of said locking panels having a hole formed therein at each end for mating with deck surface locking means.

* * * * *